Feb. 8, 1938.  G. F. GARDNER  2,107,936
LIGHT BEAM INSTRUMENT
Filed July 24, 1936
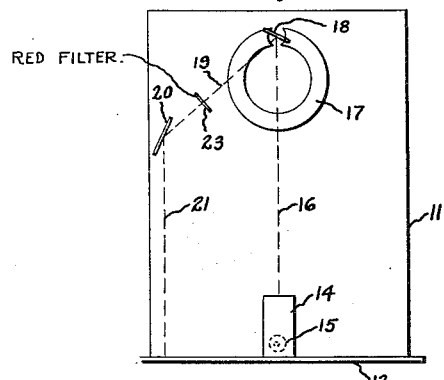
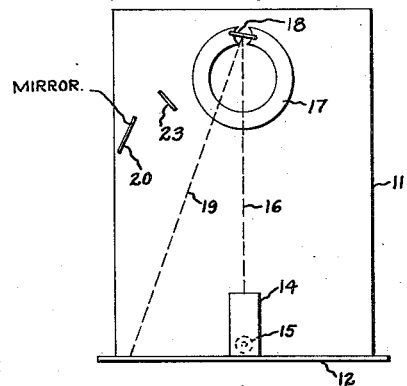
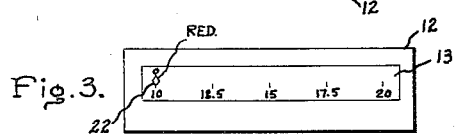
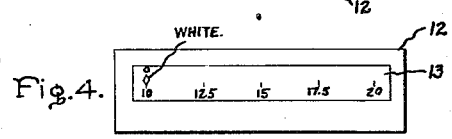
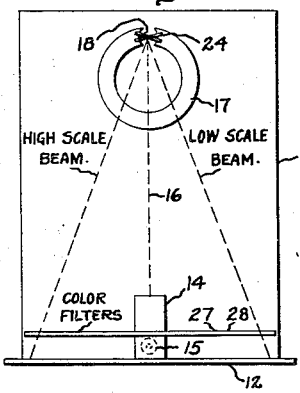
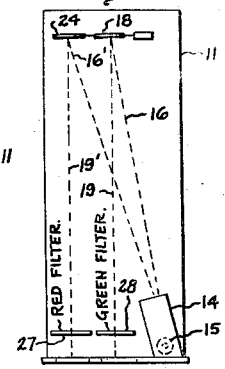
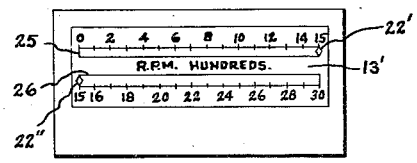
Inventor:
George F. Gardner
by Harry E. Dunham
His Attorney.

Patented Feb. 8, 1938

2,107,936

UNITED STATES PATENT OFFICE 2,107,936

LIGHT BEAM INSTRUMENT

George F. Gardner, Scotia, N. Y., assignor to General Electric Company, a corporation of New York Application July 24, 1936, Serial No. 92,433

2 Claims. (Cl. 116—114)

My invention relates to electrical instruments and concerns particularly indicating instruments of the light-beam type.

It is an object of my invention to provide a suppressed-zero instrument having an arrangement for indicating the zero position and permitting zero adjustment of the instrument mechanism.

It is a further object of my invention to provide a compact light-beam instrument with a relatively great scale range and high target clarity.

Still another object of my invention is to provide a light-beam instrument having a multiple set of graduations passed over successively by the indicating target.

Other and further objects and advantages will become apparent as the description proceeds.

In carrying out my invention in its preferred form, I provide a light-beam instrument with a moving element capable of deflecting its light beam through a greater angle than that subtended by the scale or the translucent screen of the instrument. For bringing the beam back on the scale when deflection of the movable element is such that the beam would otherwise go off the end of the scale, I provide an auxiliary mirror or reflector which may be stationary or may be carried by the movable element.

The invention will be understood more readily from the following detailed description when considered in connection with the accompanying drawing and those features of the invention which are believed to be novel and patentable will be pointed out in the claims appended hereto. In the drawing, Fig. 1 is a schematic diagram representing a plan view of the working parts of a suppressed-zero instrument constituting one embodiment of my invention and showing the movable element in its zero position; Fig. 3 is a front elevation showing the scale of the apparatus of Fig. 1 with a scale reading for the condition represented in Fig. 1; Fig. 2 is a diagram of the same apparatus shown in Fig. 1 with the moving element in the position corresponding to the lowest reading of the scale of the instrument; Fig. 4 is another front elevation showing the scale of the instrument with a scale reading for the condition represented in Fig. 2; Fig. 5 is a schematic diagram representing a plan view of the working parts of another embodiment of my invention provided with a double tier of scales for increasing the scale range of the instrument; Fig. 6 is a front elevation of the apparatus of Fig. 5 showing the scale; and Fig. 7 is a schematic diagram representing a side elevation of the working parts of the apparatus of Fig. 5. Like parts are designated by like reference characters throughout in the drawing.

Referring now more in detail to the drawing, the apparatus of Figs. 1 to 4 comprises a light-tight box 11 with a front wall 12 having a window occupied by a translucent screen 13 marked with suitable graduations and numerals to serve as an indicating scale. Within the light tight box 11, there is a light-directing tube 14 containing a source of light, such as an incandescent lamp 15, for projecting a beam of light 16. An instrument mechanism 17 having a suitable deflecting element, such as a coil (not shown), carries a mirror 18 intersecting the path of the light beam 16. The mirror 18 is adapted to reflect a beam along the course 19 and the portion 19 of the light beam is adapted to deflect back and forth across the scale 13 in accordance with deflection of the movable element 18 caused by variations in the magnitude of the quantity being measured.

In order to increase the compactness of the instrument and the clarity of the graduations, the arrangement is such that, as the measured quantity increases from zero to a predetermined value, the beam 19 remains off the scale 13 and does not approach the lower end of the scale until a predetermined value is reached, thus forming a suppressed-zero instrument. This arrangement also permits keeping the deflection angle of the beam small enough to insure a clear and sharply focused light spot at any position on the scale. In the arrangement illustrated, the instrument has a full-scale reading of twenty and is adapted to measure values between ten and twenty, the values below ten being suppressed.

Inasmuch as indicating instruments are subject to certain secular errors which cause variations in the zero position and, consequently, constant errors at every scale point, it is customary to provide zero-adjusting mechanism for bringing the indication back to zero when the measured quantity is known to be zero; for example, in the case of an ammeter, when the meter is disconnected. However, in the case of suppressed-zero instruments, this check on the adjustment is not available and, in the case of secular changes in the instrument or inadvertent or unauthorized manipulation of the zero adjustment, there is no way of checking the instrument except by recalibration of the scale. In order to overcome this difficulty, I provide an auxiliary mirror 20 placed in the part of the box where it will intercept the portion 19 of the light beam when the movable element 18 is in the zero position. The mirror 20 is placed at such an angle that it reflects the beam 19 along a line 21 to strike the scale 13 at a suitable point, for example, the minimum scale value, ten, which is accordingly also marked zero. If the spot of light 22 produced on the scale 13 by the light beam does not coincide with the position of the zero graduation when the instrument is disconnected from the electrical circuit which it is measuring, its zero adjustment, not shown, is manipulated to bring the light spot 22 to the proper position. When the measured value rises appreciably above zero, the beam 19 leaves the mirror 20 and no light spot appears on the scale 13 until the minimum value, ten of the scale is reached.

To guard against mistaking a zero indication for the reading 10, a color filter, for example, a red filter 23, may be interposed in the path of the light beam between the mirrors 18 and 20 or between the mirror 20 and the scale 13. A zero reading may also be distinguished from a ten reading by slightly tilting the mirror 20 so that it causes a light spot to appear above or below the line along which the light spot would travel for readings from ten to twenty. If desired, instead of placing the auxiliary mirror 20 at a stationary position in the light box 11, it may be mounted on the movable element 18 at the proper angle, as explained more in detail in connection with Fig. 5. Although the arrangement of Fig. 1 finds its principal use as a suppressed-zero instrument, it will be understood that, by making the mirror 20 of sufficient length or by providing a number of auxiliary mirrors corresponding to the mirror 20, the light spot 22 produced by the reflected beam 21 may be caused to traverse the scale 13 for an appreciable distance, thus extending the range of readings which may be made with the scale 13 by utilizing light spots produced both by the beam 19 reflected directly from the mirror 18 and the beam 21 reflected from the mirror 20. It will be apparent that the use of a stationary auxiliary mirror 20 will cause the beam 21 to deflect in the opposite direction from the beam 19, whereas mounting the auxiliary mirror on the movable element would cause the beams corresponding to the two ranges of measurement to deflect in the same direction.

The arrangement of Fig. 5 is intended primarily for increasing the range of deflection of a light-beam instrument without lessening the compactness of the apparatus and clearness of the light-spot target. It will be seen that the translucent screens 13 of Figs. 2 and 3 and 13' of Fig. 6 subtend an angle of approximately 37½ degrees whereas deflecting instruments of the moving coil and other types may readily be produced having angular deflections of 90 or more degrees. Furthermore, the reflection of the beam by the moving mirror makes the angle of deflection of the movable beam double the angle of deflection of the instrument element, consequently, in the ordinary single-range light-beam instrument, there is a large angle of deflection of the instrument element which is unused. To make use of this unused angle of deflection, I provide a scale or translucent screen 13' having two or more tiers or rows of graduations and I provide two or more mirrors 18 and 24 carried by the movable element of the instrument mechanism 17 at angles to each other.

In the specific arrangement illustrated, the scale 13' has an upper tier of graduations 25 for numerical values from zero to fifteen and a lower tier of graduations 26 for numerical values from fifteen to thirty. The movable mirrors 18 and 24 are placed at such angles that, as the instrument 17 deflects through the angle corresponding to the readings between zero and fifteen, the mirror 24 reflects a light beam 16' to produce a movable beam 19' forming a light spot 22' moving back and forth along the tier of graduations 25 of the scale 13'. The mirror 18 reflects a light beam 16 to produce a movable beam 19 casting a light spot 22" moving across the lower tier 26 of the scale 13'. In the arrangement shown, the upper tier 25 carries the graduations for the lower half of the range of the instrument and the tier 26 carries the graduations for the upper half of the range of the instrument.

The invention, of course, is not limited to this specific arrangement. It will be observed that the mirrors 18 and 24 are not only at an angle to each other with respect to the axis of the moving element of the instrument 17 but are also slightly tilted so that they produce light spots 22' and 22" traveling in different parallel lines. In this way, any confusion is prevented as to whether the reading observed is within the lower or upper range of the instrument. As a further safeguard against any such confusion, filters of different colors, for example, a red filter 27 and a green filter 28 may be provided for the movable beams 19' and 19, respectively, cooperating with the two different tiers of the scale 13'. If the color filters are utilized for distinguishing the movable beams in the two ranges of the instrument, additional mirrors may be provided for reflecting the beams on to the same line of the scale 13' in cases where such additional compactness may be of value. If desired, the arrangement may be such that the values of the graduations in the tiers 25 and 26 of the scale 13' overlap to a certain extent in order to check one tier against the other. For example, in the arrangement shown, the value fifteen appears on both tiers 25 and 26.

As already explained, if a greater scale range is desired, that is, a greater spacing of the graduations in each portion of the scale, this may be accomplished by providing additional movable mirrors and additional tiers in the scale 13'. The arrangement is of particular value in certain applications such as tachometer indicators for flight testing of aircraft engines, in which a long scale is required in order to estimate true engine speed closely but which must occupy a minimum space. In some cases, no readings are required for the lower portion of the scale and the graduations from one to fifteen may be omitted, retaining only the zero graduation to facilitate adjusting the zero of the instrument as explained in connection with Figs. 1 and 3.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. An indicating instrument of the light-beam type comprising in combination, a source of light, a movable element carrying a pair of mirrors cooperating with said light source to cause beams of light to be reflected in response to deflection of the movable element, a scale cooperating with said light source and said mirrors so as to be traversed by said beams of light, said movable element being adapted to deflect through an angle substantially greater than that required to advance one of the light beams the length of said scale and one of said mirrors being mounted at such an angle as to cause a light beam to traverse said scale during one portion of the angular movement of said movable element, the second mirror being mounted at such an angle as to cause a beam of light to traverse said scale during a succeeding portion of the angular movement of said movable element, and filters of different colors interposed in the paths of said light beams to make their appearances on said scale distinguishable for different portions of the movement of said movable element.

2. An indicating instrument of the light-beam type comprising in combination, a source of light, a movable element carrying a pair of mirrors cooperating with said light source to cause beams of light to be deflected in response to deflection of the movable element, a scale cooperating with said light source and said mirrors so as to be traversed by said beams of light, said movable element being adapted to deflect through an angle substantially greater than that required to advance one of the light beams the length of the said scale and one of said mirrors being mounted at such an angle as to cause the light beam to traverse said scale during one portion of the angular movement of said movable element, the second mirror being mounted at such an angle as to cause the beam of light to traverse said scale during a succeeding portion of angular movement of said movable element.

GEORGE F. GARDNER.